United States Patent [19]

Zimmerli et al.

[11] 4,196,923

[45] Apr. 8, 1980

[54] ADHESIVE BONDING OF ALUMINUM COILS

[75] Inventors: Robert H. Zimmerli, Weedsport; James E. Greever, De Witt, both of N.Y.

[73] Assignee: Carrier Corporation, Syracuse, N.Y.

[21] Appl. No.: 854,922

[22] Filed: Nov. 25, 1977

[51] Int. Cl.$^2$ .............................................. F16L 13/10
[52] U.S. Cl. ............................... 285/284; 29/157.3 R; 228/119; 228/203; 285/157
[58] Field of Search ............... 285/21, 287, DIG. 16, 285/284, 291, 157; 29/157.3 R; 156/293, 294; 228/119, 201, 203; 106/302

[56] References Cited

U.S. PATENT DOCUMENTS

| | | | |
|---|---|---|---|
| 3,476,408 | 11/1969 | Wolfe | 285/21 |
| 3,498,866 | 3/1970 | Kilbane | 156/294 |
| 3,633,266 | 1/1972 | Taylor | 285/287 X |
| 3,636,186 | 1/1972 | Sturley | 156/293 |
| 3,750,248 | 8/1973 | Morris | 285/287 X |
| 3,796,783 | 3/1974 | Greever | 156/293 |
| 3,877,518 | 4/1975 | Dreksler | 285/DIG. 16 |

OTHER PUBLICATIONS

*Bonding and Assembly Method,* In Machine Design pp. 166–174, Apr. 1954.
*Adhesive Bonding, Some Important Applications,* In Machinery and Production Engineering, pp. 1028–1035, May 29, 1968.
*Adhesive Bonding, Some Important Applications,* In Machinery and Production Engineering, pp. 933–939, May 15, 1968.

*Primary Examiner*—Dave W. Arola
*Attorney, Agent, or Firm*—J. Raymond Curtin; Robert P. Hayter

[57] ABSTRACT

The present invention is directed to a method and apparatus for joining aluminum members within an aluminum heat exchanger coil. A tubular member to be joined to a separate member in the coil has its exterior surface roughened by sand blasting to enhance adhesive adherence. The roughened surface is covered with a conversion coating to replace any accumulated aluminum oxide, to prevent the formation of additional aluminum oxides and to simultaneously provide a surface adapted to adhere to an adhesive. An adhesive is then applied to the mating areas of the tubular members to be joined and subsequently cured to form a tight secure joint. This invention is particularly useful in field repair of aluminum heat exchanger coils.

2 Claims, 3 Drawing Figures

ADHESIVE BONDING OF ALUMINUM COILS

BACKGROUND OF THE INVENTION

In the refrigeration and air conditioning industry it has become a wide spread practice to utilize all aluminum heat exchanger coils. These coils are used within both the condensing units and the evaporating units of many refrigeration and air conditioning applications. In particular, aluminum is used because it is less costly than copper and more available. A typical problem of an aluminum heat exchanger coil is that once the coil suffers a fracture or other damage occurs within a section thereof it has heretofore been difficult to substitute a replacement section for the faulty section in the field. With copper coils, the section to be replaced was merely unsoldered and a new one soldered in place. However, all aluminum coils have been typically assembled by joining certain parts using a flux solder process or an ultrasonic dip solder process wherein special equipment is utilized to join the two aluminum parts. It is highly impracticable to make field repairs utilizing either the flux solder method or the ultrasonic dip soldering process.

Adhesives have been suggested for utilization in combining the various components of all aluminum heat exchanger coils. In U.S. Pat. No. 3,498,866 issued to Kilbane and assigned to Minnesota Mining and Manufacturing Company, there is disclosed a method of making a tube joint by applying an adhesive collar onto the end surface of the tubing section. Other patents have been issued dealing with adhesive bonding of the coils. In particular U.S. Pat. No. 3,636,186 issued to R. A. Sturley, deals with the factory bonding of tube joints by an accurate metering of a predetermined quantity of thermosetting adhesive to a particular location of a joint as does U.S. Pat. No. 3,796,783 issued to J. E. Greever, a co-inventor herein. Both of these patents require a treatment of some nature to the adhesive, either providing a particular collar arrangement or metering the adhesive into the joint. Neither of these is particularly suitable for field use in repairing the faulty section of the coil.

It has been found that when field repairs are made to all aluminum coils that the faulty section may be unsoldered from the coil using conventional unsoldering processes. The application of heat to the joint to be unsoldered is sufficient to melt the solder utilized by either the flux process or the ultrasonic dip soldering process. When the section is removed from the coil, roughened surfaces are left which are suitable for bonding by an adhesive. However, the replacement part supplied by the factory has been exposed to the atmosphere and consequently has a surface layer of aluminum oxide formed thereon. By applying adhesive directly to these aluminum oxides the strength of the joint is greatly reduced since the bonding strength of the aluminum oxide is significantly less than that of the underlying aluminum. The invention described herein provides for roughening the surface of the replacement part to increase adhesive adherence and thereafter applying a conversion coating to the surface such that the aluminum oxides are replaced with the conversion coating and the formation of additional aluminum oxide is prevented and simultaneously a strong surface adapted to be bonded by an adhesive is provided.

SUMMARY OF THE INVENTION

It is an object of the present invention to provide a method for bonding aluminum members together.

It is a further object of the present invention to provide a method for field repair of aluminum heat exchanger coils.

It is another object of the present invention to join a premanufactured aluminum replacement part to an aluminum coil without the necessity of chemically cleaning the aluminum oxide from the replacement part.

It is also an object of the present invention to coat the exterior surface of the replacement part with a conversion coating such that the aluminum oxides are replaced with the conversion coating, the formation of aluminum oxide on the surface of the part is inhibited and a surface adapted to be adhesively bonded is provided.

It is a yet further object of the present invention to provide a surface which is not susceptible to being undermined by corrosion.

It is an object of the present invention to provide a safe, reliable and economical method for joining a first aluminum member to a second aluminum member.

The above objects are accomplished by the provision of an aluminum member which has had the surface to be bonded to a second aluminum member sandblasted, glass bead blasted or wire brushed to enhance adhesive adherence. The roughened surface is then coated with a conversion coating typically a chromate formulation to replace the aluminum oxides, to prevent the further formation of aluminum oxide and to simultaneously form a surface which is adapted to be bonded to an adhesive. An adhesive is then applied to surfaces of the first member and the second member to be joined and thereafter cured, bonding the two aluminum members to each other. This method of bonding aluminum members is particularly useful in field repair of aluminum heat exchanger coils. This method is further particularly adapted to those suppliers who provide premanufactured replacement parts for use in field repair of aluminum heat exchangers.

DESCRIPTION OF THE PREFERRED EMBODIMENT

It will be apparent from the description to follow that the present invention has many uses. The bonding of two aluminum members to each other may be utilized in a myriad of applications. The description hereafter to follow will describe the bonding of a replacement aluminum section within an aluminum heat exchanger coil. It will be obvious from the description to follow that although this method is described for use in the field replacement of faulty sections of heat exchanger coils, it would be likewise applicable to factory assembly of heat exchanger coils and/or factory assembly of other aluminum members.

Figure 1:
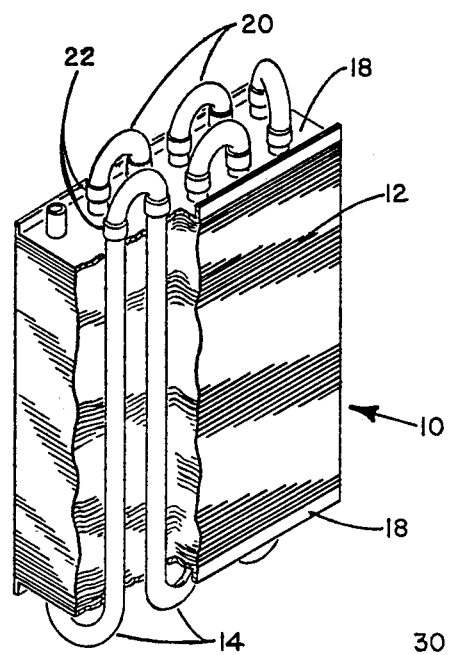
FIG. 1 is an isometric view of a heat transfer coil to which the present invention may be applied, a portion thereof having been broken away to better show the tube and fin structure.

Referring now to FIG. 1, there can be seen a heat exchanger 10 comprised of plate fins 12 and tube sheets 18 on each end of the heat exchanger, return bends 20 and hairpins 14. Hairpins 14 are U-shaped tubes extending through one tube sheet 18, through plate fins 12 and extending beyond the second tube sheet 18. The ends of the hairpins extending beyond the second tube sheet are formed into a bell shape. The bell shaped end is so designed that the return bends 20 may be inserted within the bell end such that a joint may be formed thereat. The bell shaped ends 22 are formed on both ends of each hairpin 14.

Figure 2:
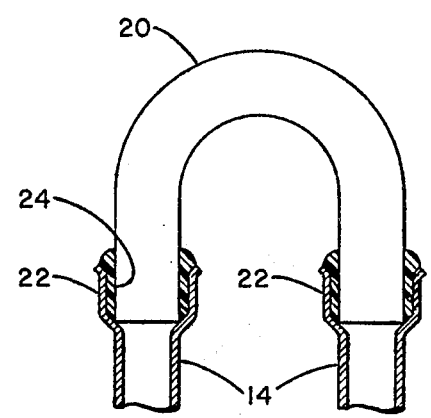
FIG. 2 is a fragmentary view taken partially in section showing a typical bell and spigot joint as utilized in the practice of this invention and the field repair of a heat exchanger coil.

Referring to FIG. 2, which is an enlargement of the return bend and bell shaped joint of FIG. 1, it can be seen that hairpin 14 has bell ends into which the distal portions of the return bends 20 are inserted. Between the distal exterior surface of the return bends 20 and the belled end 22 there is shown adhesive 24. This adhesive, typically a thermal setting resin such as epoxy, is utilized to fixedly secure the return bend to the hairpin.

Figure 3:
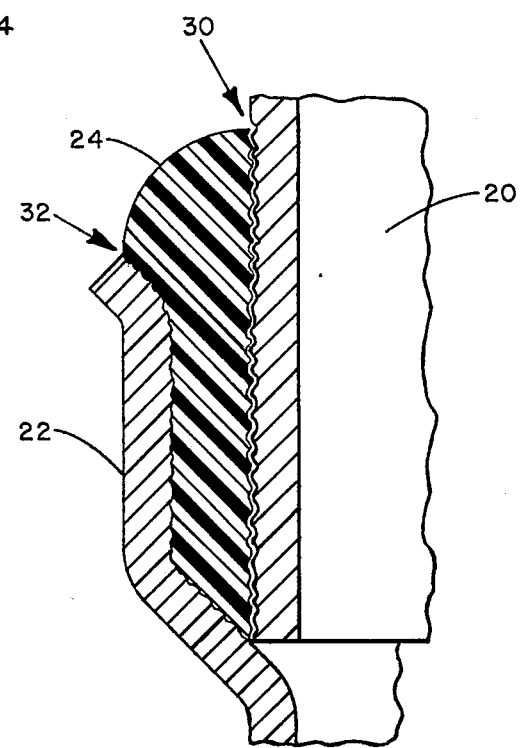
FIG. 3 is an enlarged and exaggerated fragmentary view taken partially in section of the bell and spigot joint of FIG. 2.

When a heat exchanger such as heat exchanger 10, fails in the field, typically a return bend must be replaced. The faulty return end is unsoldered from the belled end of the hairpins 14, the return bends having been originally soldered either by a flux process or an ultrasonic soldering process when the heat exchanger coil was manufactured. Upon the return bend 20 being unsoldered it is removed from the bell shaped ends of the hairpins such that a rough soldered coated surface is left remaining within the interior of the belled ends (indicated as surface 32 on FIG. 3). The faulty return bend is then replaced with the replacement return bend premanufactured to fit the coil where the faulty section has been removed. The exterior surface of the distal ends of the replacement section has been sand blasted, wire brushed or glass bead blasted (as can be seen in exaggerated form in FIG. 3) or otherwise roughened to provide a surface having good adhesive adherence. Glass bead or sand blasting serves to randomly roughen the surface to provide an irregular surface to aid in the adhesive characteristics of the adhesive utilized in making the joint. The roughened surface provides more surface area to which the adhesive may bond and provides an irregular surface less subject to shear failure. If this process is used in the factory it will be necessary to roughen the interior surface of the belled end since there will be no roughened solder remaining from the removal of a return bend.

Once the distal surfaces are roughened, a conversion coating preferably a sodium dichromate formulation which often includes an acid such as hydrofluric acid (shown as conversion coating 30 in FIG. 3), is applied such that the roughened distal surface of the return bend 20 is covered with this material (however, similar formulations commercially available can serve the same purpose including sodium bichromate, chromate and sodium chromate formulations). By the surface being covered, contact with the atmosphere is precluded and no further aluminum oxide will be formed. This conversion coating further acts to provide a surface adapted to be bonded by an adhesive. Typically, aluminum oxide formed on the surface of the return bend has an approximate bond strength of 400 lbs. When secured by an adhesive to the bell shaped end of a hairpin. When this same distal end has been roughened to enhance adhesive adherence and thereafter conversion coated, the bond strength of the same adhesive joint approaches 2400 lbs.

The use of the conversion coating eliminates the step of chemical cleaning necessary to remove the aluminum oxide formed on the surface of the return bend. Chemical cleaning has previously been used to remove the aluminum oxides, consequently, almost immediate bonding of the return bend to the belled end was necessitated. Chemical cleaning involved the use of messy and oftentimes dangerous chemicals in a situation that was unacceptable. By using the conversion coating and roughening method described herein the replacement part may be treated at the factory such that no additional chemical cleaning is needed at the field repair point.

The use of this method further provides for a better adhesive surface. By sand blasting, wire brushing or glass bead blasting, the exterior of the distal surface of the return bend is sufficiently roughened that there is more surface area for the adhesive to bond to and rough areas to prevent shear failures. This conversion coating further serves to form a tight layer to the solid aluminum of the return bend such that corrosion by undermining is prevented. There is no aluminum oxide layer for the corrosion to work its way between the adhesive and the return bend to be joined.

The invention has been described in detail with particular reference to a preferred embodiment thereof, but it will be understood that variations and modifications can be affected within the spirit and scope of the invention.

What is claimed is:

1. Field repair tubing adapted to be bonded by an adhesive to an aluminum heat exchanger for replacement of a faulty section of the aluminum heat exchanger which comprises:
    an aluminum tubular member sized to replace the faulty section of said heat exchanger, said tubular member having roughened distal exterior surfaces, and
    a chromate formulation coating on the roughened surfaces of the tubular member which prevents the formation of aluminum oxides and promotes bonding with an adhesive, the coating being sufficiently thin that the roughened contour of the exterior surface of the tubular member is substantially maintained.

2. A joint between aluminum tubular members which comprises:
    a first tubular member from which a faulty part has been removed leaving a roughened surface on the first member at the area at which the first member was joined to the faulty part;
    a second tubular member sized to be joined to the first tubular member, said second tubular member having had its exterior surfaces roughened and a chromate formulation coating applied to the roughened surfaces to prevent the formation of aluminum oxides and to promote adhesive bonding, the coating being sufficiently thin that the roughened contour of the exterior surface of the tubular member is substantially maintained, and
    an adhesive for securing the roughened surface of the first tubular member to the second tubular member at the roughened and coated area thereof.

* * * * *